D. J. BROPHY.
INCUBATOR.
APPLICATION FILED FEB. 20, 1917.
1,255,700. Patented Feb. 5, 1918.
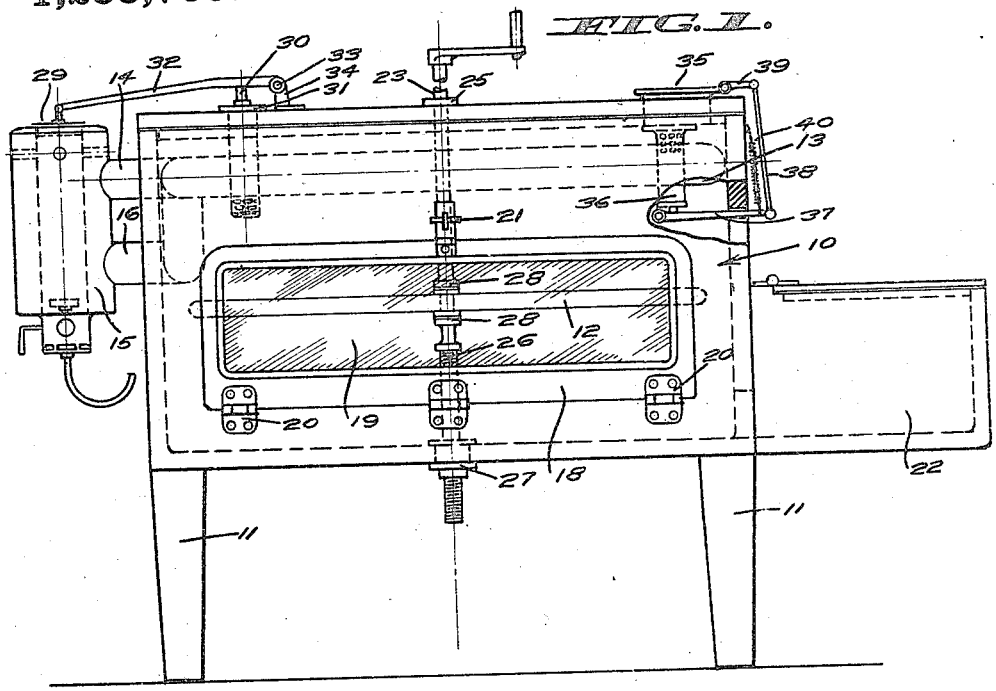
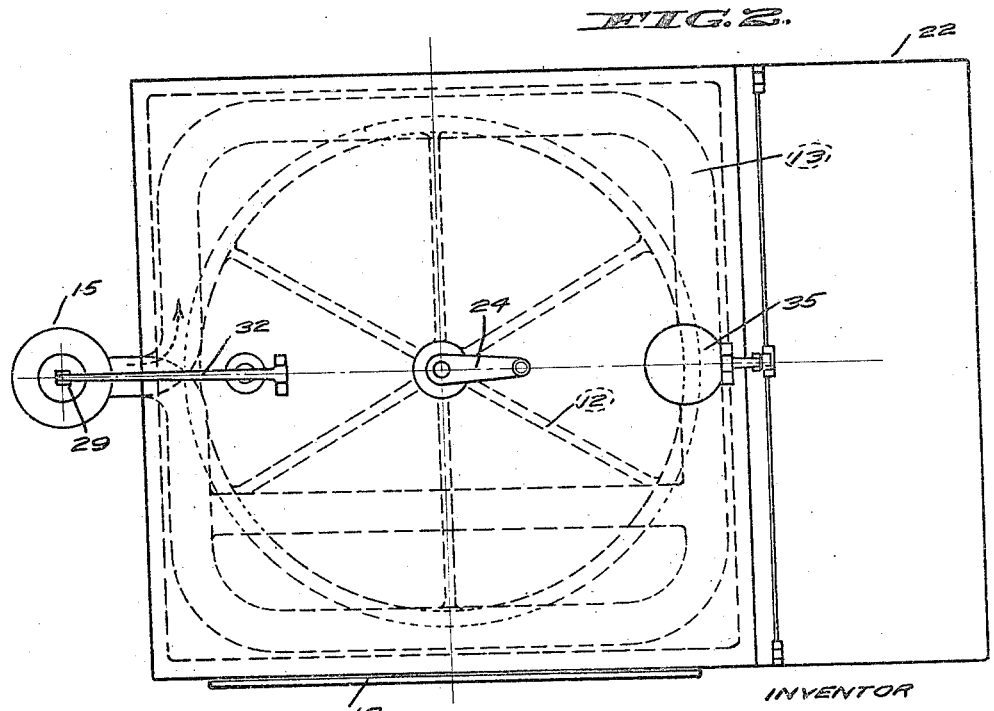
INVENTOR
DANIEL J. BROPHY

UNITED STATES PATENT OFFICE.

DANIEL J. BROPHY, OF SAN FERNANDO, CALIFORNIA.

INCUBATOR.

1,255,700.

Specification of Letters Patent.

Patented Feb. 5, 1918.

Application filed February 20, 1917. Serial No. 149,907.

*To all whom it may concern:*

Be it known that I, DANIEL J. BROPHY, a citizen of the United States, residing at San Fernando, in the county of Los Angeles and State of California, have invented new and useful Improvements in Incubators, of which the following is a specification.

My invention relates to incubators, my object being to improve the lay-out and details of construction, and the invention consists in the novel features herein shown, described, and claimed.

The invention is illustrated, by way of example, in the accompanying drawings in which:

Figure 1 is a view in side elevation illustrating the incubator as fitted with a heating apparatus and thermostatic controls therefor.

Fig. 2 is a view in plan illustrating the incubator and particularly disclosing the circular formation of the egg table.

Referring more particularly to the drawings, 10 indicates an incubator cabinet which is here shown as supported on a series of legs 11. This cabinet is substantially square in horizontal configuration and is of a depth sufficient to permit an egg tray table 12 to be vertically adjusted toward and away from a hot-water heating pipe 13. The trays are in the form of sectors mounted loosely upon the table 12, as indicated in dotted lines in Fig. 2. This pipe is disposed around the side walls of the cabinet and connects at one end with a pipe 14 which leads into the upper end of a hot-water heater 15. The other end of the pipe 13 is brought downwardly and communicates with the lower end of the heating apparatus through a pipe 16. In this manner a circulation of heated water is maintained within the incubator and distributed uniformly throughout the top of the incubator. The heat is partially confined within the heater by means of a top covering which may be removed when desired. The front of the cabinet is here shown as provided with an outwardly and downwardly swinging door 18 fitted with an observation 19 formed of glass or other transparent substance. This door is mounted on hinges 20 and is held in place by a lock 21. A brooder compartment 22 is built along one side of the cabinet and in communication therewith.

The egg table 12 is circular and is mounted upon a vertically extending revoluble shaft 23 which is rotated, when desired, by means of a crank 24. This shaft passes through a bushing 25 in the top of the cabinet and is formed at its lower end beneath the table with a threaded portion 26. The threaded end of the shaft extends downwardly through a threaded bushing 27 mounted in the floor of the cabinet and, as will be seen, will cause the egg table to be raised and lowered as the shaft is rotated along its thread. As a matter of convenience the table is loosely mounted between the collars 28 and 29 on the shaft and is thereby afforded rotation independent of the shaft movement, thus permitting the trays upon the table to be moved around in front of the brooder opening when the eggs are hatching.

The heating apparatus provided to supply the pipe 13 with hot water may be of any desired construction and is here shown as a gas or oil heater, the heat compartment of which is in communication with pipes 14 and 16, as previously described. The central portion of the heater is preferably formed with an opened upper end which is normally closed by a thermostatically operated damper 29. The damper is provided to permit the heater to cool when the interior of the egg cabinet is excessively heated. As here shown, the damper is automatically operated by means of a thermostat rod 30 which extends downwardly into the cabinet within a suitable housing 31. This rod is adapted to move vertically and to act upon a lever arm 32 which is mounted upon a pivot pin 33 secured within a bracket 34. The outer end of this lever arm pivotally supports the damper 29 and raises and lowers it as actuated by the thermostat member 30. Thus it will be seen that when the interior of the cabinet has reached a predetermined temperature the damper 29 will be raised to permit the heating apparatus to cool.

As a means for further insuring that the interior of the egg cabinet will be maintained at a given heat, a damper 35 is mounted upon an opening through the top of the cabinet. This opening is of sufficient size to permit the cabinet to readily cool and the damper 35 is raised and lowered thereover by means of a thermostat control 36 positioned within the heater and acting through a thermostat lever 37, a drawbar 38 and a short damper lever 39 to open and close the opening when the interior of the incubator has reached an excessive degree of heat. The damper 35 is normally held down by a spring 40 which acts in opposition to the thermostat.

In operation, the heating apparatus is lighted and a circulation of hot water caused to flow around through the pipe 13 and returned to the outer chamber of the heater. When the process of incubation is begun the eggs upon the table 12 will be supported adjacent the heat pipe and as the incubation progresses the crank 24 will be rotated to gradually lower the eggs and decrease the degree of heat to which they are subjected. When the incubation is completed the table will be near the floor of the incubator and in easy communication with the brooder 22, to which the chicks may be carried as hatched.

When there are changes in atmospheric conditions the interior of the cabinet will vary in heat temperature and when it has become excessively heated the thermostat 30 will first operate to raise the damper 29 on the heater, it being set at a temperature of approximately 103 degrees Fahrenheit. If the temperature is still too high within the incubator the thermostat 36 will actuate to raise the damper 35 and thereby further cool the incubator.

I claim:

1. In an incubator, a cabinet, means for heating the cabinet, a brooder compartment extending from the cabinet and communicating therewith, a shaft vertically mounted and extending from above the cabinet to below the cabinet and through the center thereof and having a screw-threaded lower end, a nut fixed in the bottom of the cabinet through which the screw-threads operate, a circular egg tray table in the cabinet, said shaft extending through the center of the table, and collars above and below the table fixed upon the shaft.

2. In an incubator, a suitable rectangular cabinet having a door opening in one side, a door for the opening, a circular egg tray table, a shaft extending from above the cabinet downwardly through the center of the cabinet and through the center of the egg tray table to a point below the cabinet, the lower end of the shaft being screw-threaded and there being a nut mounted in the bottom of the cabinet through which the screw-threads operate, and collars fixed upon the shaft above and below the egg tray table.

In testimony whereof I have signed my name to this specification.

DANIEL J. BROPHY.

Copies of this patent may be obtained for five cents each, by addressing the "Commissioner of Patents, Washington, D. C."